Patented May 26, 1942

2,284,127

UNITED STATES PATENT OFFICE 2,284,127

ESTERS OF POLYGLYCEROL

Herman A. Bruson, Philadelphia, Pa., assignor to Röhm & Haas Company, Philadelphia, Pa.

No Drawing. Application June 7, 1940, Serial No. 339,330

5 Claims. (Cl. 260—410)

This invention relates to new compositions of matter which are effective as emulsifying, wetting, and dispersing agents. The new compositions are also effective as insecticides, as disclosed in my copending application Serial No. 259,317 filed March 2, 1939, of which the present application represents a continuation-in-part.

The object of this invention is to provide oil-soluble wetting, dispersing, and emulsifying agents. It is also an object to provide such agents which are compatible and useful in conjunction with other wetting, dispersing, and emulsifying agents, improving the value of the latter agents, and overcoming their incidental deficiencies, such as imparting low viscosities, causing drain-off of solutions, etc.

The new compositions of matter are in general thick, balsam-like materials obtained by reacting polyglycerol with a substantial proportion of a monobasic, aliphatic acid which is not of the drying type, or of a cycloaliphatic acid, or of mixtures of these two types of acids together with a lesser proportion of a resin-forming, dicarboxylic acid. The resulting composition disperses readily in water to yield sprays useful as insecticides, solutions for wetting and conditioning yarn, etc. The compositions may, on the other hand, be dissolved in oils or oily materials and used in this form or in the form of emulsions.

The monobasic, aliphatic acids which are useful in this invention contain from eight carbon atoms upward. They may contain a chain interrupted by oxygen. Typical acids include caproxyacetic acid, capryl phenoxyacetic acid, undecylenic acid, caprylic acid, lauric acid, palmitic acid, ricinoleic acid, oleic acid, stearic acid, etc. Pure acids may be used, or commercially available acids obtainable from non-drying oils, such as cocoanut oil, castor oil, cottonseed oil, etc. The cycloaliphatic acids react much like the aliphatic acids, the most important being naphthenic acids from petroleum. An individual aliphatic acid of the type prescribed, or cycloaliphatic acid, or mixtures thereof, may be used as a starting material.

The resin-forming dicarboxylic acids which have proved to be of value include phthalic, succinic, maleic, and sebacic acids and mixtures of these acids.

The polyglycerol, which is reacted with the acids, is prepared by heating glycerol at an elevated temperature in the presence of a little alkali. In the preferred procedure about 1% of potassium hydroxide is added to glycerine which is stirred and heated at 250–260° C. in an inert atmosphere until there has been a weight loss of 25 to 30%. The viscosity of a 75% solution of the polyglycerol prepared in this way usually corresponds to "D" on the Gardner-Holdt scale.

In preparing the wetting, dispersing, and emulsifying composition from the above materials the polyglycerol, the monobasic aliphatic or cycloaliphatic acid, and the resin-forming acid are mixed and heated under an inert atmosphere until the acid number of the resulting product is reduced to a low value, preferably below 15, and the viscosity is about "B" to "D" on the Gardner-Holdt scale. Temperatures between 180° C. to 240° C. are used to effect the reaction, the temperature chosen depending upon the particular combination of materials, the exact nature of the product desired, and its intended use.

The products obtained are thick and syrupy at ordinary temperatures, although they usually solidify in the cold. The products are non-resinous. Films of the product are oily and somewhat tacky but are non-drying. The products are dispersible or soluble in water, oils, and various organic solvents.

In the preferred compositions about twice as much of the monobasic aliphatic or cycloaliphatic acid is taken as of polyglycerol. These acids in general constitute about 45% to about 75% of the total materials reacted with the polyglycerol constituting 40% to 20%. The amount of resin-forming dicarboxylic acid which can be used does not exceed 15% of the materials and may be as low as 3%. The exact proportions of the various starting materials which are reacted depend upon the particular materials selected. The proportions must be so selected and adjusted that a homogeneous, non-drying material results. If larger amounts of a dicarboxylic acid is used than indicated, there is danger of the separation into a resinous mass and an oily layer of little value. Also, the proportions must be so selected that a low acid number is reached without over long heating of the reacting materials, for with excessive times of heating or excessive temperatures the acid number may at first decrease and then increase.

When the compositions are to be used as insecticides or in parasiticidal mixtures the acid number, as determined by the usual methods used in varnish and resin making, must be low, for free fatty acid has been found injurious to plants. When the acid number is between 15 and 5, the reaction product may be applied alone or in conjunction with other spray materials without danger to the more resistant plants and only slight injury to the most sensitive. When the acid number is less than 5 the reaction product can be applied at relatively high concentrations without fear of injury to even delicate plants. A low acid number has also been found highly desirable, in fact sometimes essential, in other applications than the insecticidal. In the dispersion of dyes, lakes, and pigments, material of low acid number often gives the optimum results. For various emulsions compositions essentially free from acid have also been found advantageous.

Details of the preferred process of reacting polyglycerol monobasic acid and resin-forming, dicarboxylic acid are given in the following examples.

*Example 1.*—A product was made from 100 parts of polyglycerol (prepared as shown above), 200 parts of undecylenic acid, and 20 parts of phthalic anhydride. These materials were mixed in an open kettle, heated to 200° C., and maintained at this temperature until the acid number of the mass had fallen below five. This required six and one-half hours. During this time a current of carbon dioxide gas kept an inert atmosphere above the reacting materials. Stirring was continuous and efficient. The product was thick and oily in appearance, but dispersed readily in water. It was miscible with thiocyanic acid esters, oils, hydrocarbon extracts of common insecticidal principles, etc.

In place of the undecylenic acid, there was used the fatty acid obtained from cocoanut oil. The reaction was carried on for about six hours, at which time the acid number was between two and three. This product was likewise thick and appeared oily. It was easily dispersible in water and miscible with other liquid organic insecticides.

*Example 2.*—200 parts of naphthenic acid (average molecular weight 190) was combined in an open kettle with 100 parts of polyglycerol (viscosity "D" by the Gardner-Holdt scale, when in 75% aqueous solution) and with 20 parts of phthalic anhydride. The temperature of the mass was kept at 200° C. until the acid number was 2.8. As before, efficient stirring and an inert atmosphere were used. The product was a viscous syrup which was water-dispersible and miscible with oils.

*Example 3.*—Glycerol was heated at 250° C. with 1% sodium hydroxide until a 75% solution of the product showed a viscosity at 25° C. of about D on the Gardner-Holdt scale. 100 parts of this polyglycerol, 200 parts of sec. octyloxyacetic acid, $C_8H_{17}$—O—$CH_2$—COOH, and 20 parts of phthalic anhydride were heated together at about 200° C. until the acid number of the product was less than three. This required three hours. As before, efficient stirring and an inert atmosphere were used. The product was a thick, oily material which was water-dispersible and miscible with oils, liquid organic insecticides, etc.

The compositions described are valuable wetting, dispersing, and emulsifying compositions finding a wide variety of applications alone and in conjunction with other wetting agents and other materials. They may be dissolved at low concentrations in oily compositions used for protecting metals against corrosion to cause these compositions to wet and film metal surfaces. They are advantageous in such applications since they are free from the active anions of the usual wetting agents, such as chloride or sulfate. In some of the anti-corrosive compositions the compositions of this invention serve to displace droplets of water which might otherwise remain and cause local pitting. The new compositions are useful as adjuvant agents in soaps, increasing the dispersing and emulsifying powers thereof. They find a place in numerous textile problems, such as softening and conditioning yarns and fabrics of silk, wool, rayon, linen, cotton, etc., and may be used as emulsifying agent and softener in spinning and throwing oils. They form a useful ingredient in cutting and grinding compounds. They are useful in dispersing dyes, lakes, toners, and pigments for use in printing pastes, printing inks, paints, enamels, lacquers, etc. Their value as combined insecticidal, emulsifying, wetting, and sticking agents in parasiticidal compositions has already been discussed in detail in application Serial No. 259,317, filed March 2, 1939.

I claim:

1. As a new composition of matter the substantially neutral, water-dispersible, non-resinous reaction product of 3 to 15 parts of a resin-forming, dicarboxylic acid, 20 to 40 parts of polyglycerol, and 45 to 75 parts of an acid selected from the group consisting of monobasic aliphatic acids which are not of the drying type and which possess at least eight carbon atoms, monobasic aliphatic acids having at least eight carbon atoms and having the carbon chain interrupted by an oxygen atom, cycloaliphatic acids, and mixtures of these acids.

2. As a new composition of matter the water-dispersible, non-resinous reaction product of 3 to 15 parts of a resin-forming dicarboxylic acid, 20 to 40 parts of polyglycerol, and 45 to 75 parts of an acid selected from the group consisting of monobasic aliphatic acids which are not of the drying type and which possess at least eight carbon atoms, monobasic aliphatic acids having at least eight carbon atoms and having the carbon chain interrupted by an oxygen atom, cycloaliphatic acids, and mixtures of these acids, said reaction product having an acid number less than fifteen.

3. As a new composition of matter the substantially neutral, water-dispersible, non-resinous reaction product of 3 to 15 parts of a resin-forming dicarboxylic acid, 20 to 40 parts of polyglycerol, and 45 to 75 parts of a monobasic, non-drying aliphatic acid having at least eight carbon atoms.

4. As a new composition of matter the substantially neutral, water-dispersible, non-resinous reaction product of 3 to 15 parts of phthalic acid, 20 to 40 parts of polyglycerol, and 45 to 75 parts of a monobasic, non-drying aliphatic acid having at least eight carbon atoms.

5. As a new composition of matter the substantially neutral, water-dispersible, non-resinous reaction product of 3 to 15 parts of phthalic anhydride, 20 to 40 parts of polyglycerol, and 45 to 75 parts of cocoanut oil fatty acids.

HERMAN A. BRUSON.